United States Patent [19]

Le Couteur

[11] 4,275,422
[45] Jun. 23, 1981

[54] TELECINE MACHINES

[76] Inventor: George M. Le Couteur, "Aldebaran", Rocquaine, St. Pierre du Bois, Guernsey, Channel Islands

[21] Appl. No.: 959,172

[22] Filed: Nov. 9, 1978

[30] Foreign Application Priority Data

Nov. 14, 1977 [GB] United Kingdom ............... 47225/77

[51] Int. Cl.³ .......................... H04H 3/36; H04H 7/18
[52] U.S. Cl. ..................... 358/214; 358/97; 358/140
[58] Field of Search ................. 358/214, 97, 102, 140, 358/11, 40

[56] References Cited

U.S. PATENT DOCUMENTS

| 4,127,869 | 11/1978 | Millward | 358/214 |
| 4,149,191 | 4/1979 | Longchamp | 358/214 |
| 4,151,560 | 4/1979 | Zinchuk | 358/214 |

FOREIGN PATENT DOCUMENTS

| 1464533 | 2/1977 | United Kingdom . |
| 1479976 | 7/1977 | United Kingdom . |
| 1526801 | 10/1978 | United Kingdom . |

OTHER PUBLICATIONS

D. T. Wright, "Solid State Sensors: The Use of a Single Dimension 512 Element Array for Film Scanning", BBC Research Department-1973.

*Primary Examiner*—Jin F. Ng
*Assistant Examiner*—Edward L. Coles
*Attorney, Agent, or Firm*—Robert F. O'Connell

[57] ABSTRACT

A telecine machine has a solid state sensor before which film is driven at a constant rate. To overcome differences between the film frame and television field utilization ratios, i.e. the proportion of the vertical scanning extent which is occupied by active information, and/or differences between the film frame rate and television field rate, an output signal is obtained in the form of a first sequential television signal of non-standard type, which is electronically converted to a second interlaced-scan standard signal. For example to obtain a 625/50 signal from 35 mm film, a 723/50 sequential signal is first generated, and from 8 mm film a 625/33⅓ sequential signal is first generated.

11 Claims, 11 Drawing Figures

TELECINE MACHINES

BACKGROUND OF THE INVENTION

This invention relates to telecine machines or converters for scanning film to produce a television signal, which is of the type using a linear light sensor, such as a solid state line array.

Such telecine machines have been referred to in British Pat. Nos. 1,479,976 and 1,526,801, and use the motion of the film to provide the vertical component of the scanning, and the scanning circuits in the sensor to provide the horizontal scanning. Thus the telecine machine comprises a linear light sensor array, a light source, drive means for moving film at a constant rate between the light source and the sensor array in a direction substantially perpendicular to a plane containing the sensor array, optical means for imaging an illuminated section of film on the sensor array, and electronic means for deriving a television signal from the sensor array and for converting it from sequential to interlace form.

This system is used to produce broadcast television signals, which need to be of one of the standard formats, such as 625/50 (625 lines per picture and 50 interlaced fields per second) or 525/60 (525 lines per picture and 60 interlaced fields per second). Other standards using 405 and 819 lines exist but are of decreasing importance.

Difficulties arise in the scanning film on two accounts. The first is that the ratio of the number of *active* lines of the television picture to the total number of lines per picture interval may not be the same as the ratio of the height of each film frame to the interframe pitch on the film. For convenience I shall refer to these two ratios as the utilization ratio of the television picture and of the film respectively.

The second problem is that the picture rate of the television signal in pictures per second may not be the same as the film speed in film frames per second.

Proposals have been made for overcoming these difficulties. For instance, to compensate for differences in utilization ratios, it has been suggested that the television signal could be processed to increase the number of the scanned lines which contain the active picture. Such an operation is complex and involves a large amount of storage as well as fairly sophisticated interpolation.

I have appreciated that the problem can be overcome much more simply.

SUMMARY OF THE INVENTION

In accordance with this invention the above mentioned electronic means in the telecine machine comprises first signal providing means for providing a first sequential-type non-standard television signal obtained by driving and scanning the film at a rate related to the film frame rate and film utilization ratio, and second signal providing means for electronically converting the first signal to provide a second interlaced-type standard television signal having a different line and/or field rate from the first signal.

In a preferred example the first signal providing means scans the film with a number of lines per picture which bears to the number of lines per picture of the second signal substantially the same ratio as the television picture utilization ratio bears to the film frame height utilization ratio.

BRIEF DESCRIPTION OF THE DRAWINGS

Various embodiments of the invention will now be described, by way of example, with reference to the drawings, in which.

DESCRIPTION OF THE PREFERRED EMBODIMENTS

Figure 1:
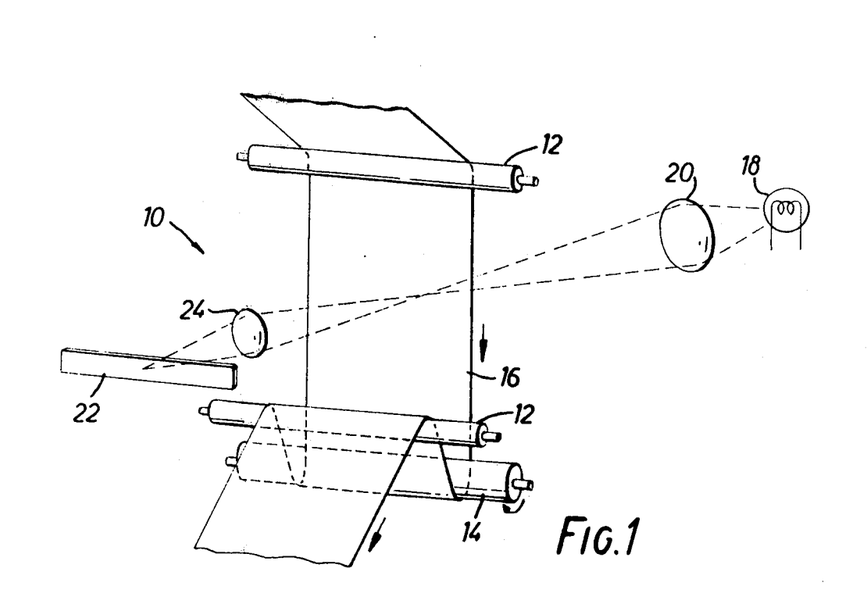
FIG. 1 is a perspective view of part of a telecine machine of the type with a linear light sensor.
Figure 2:
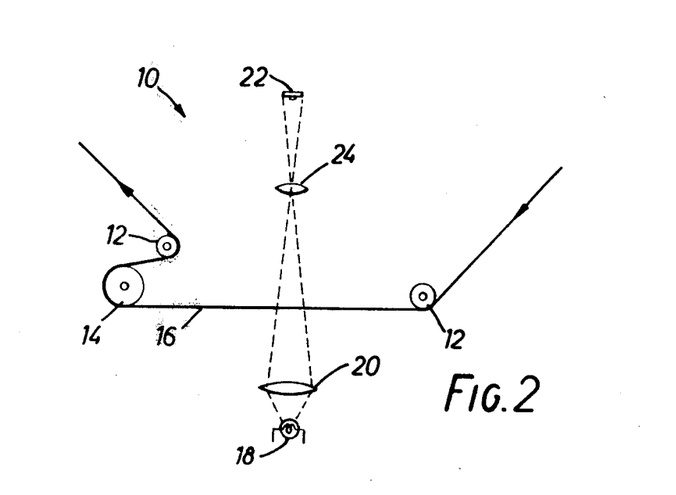
FIG. 2 is a diagrammatic side view of the telecine machine of FIG. 1.

The telecine machine 10 shown in FIGS. 1 and 2 has guide rolls 12 and a driven capstan 14 for moving a film 16 at a nominally constant rate. That is to say, the movement is not intermittent as it is in a conventional cine projector. To one side of the film is positioned a light source 18 and a collector lens 20. Opposed to the light source on the other side of the film 16 is a linear light sensor 22, aligned parallel to the width of the film, and onto which light which has passed through the film is imaged by a lens 24. The sensor 22 has a plurality of sensor elements, for example there may be 1024, and includes scanning circuitry for reading these elements sequentially from one end of the array to produce a scanned line signal.

As the film passes through the light path successive lines from the film picture are imaged on the sensor, which is scanned to produce a corresponding television signal. This is in sequential form and will need to be converted to interlace form. Apparatus for achieving this is known, and the apparatus described in British Pat. No. 1,464,533 may be used for example.

Figure 3:
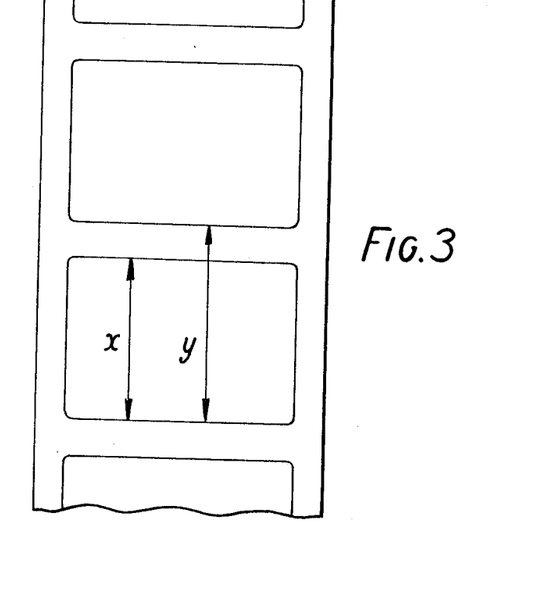
FIG. 3 shows a short length of film.

It will be appreciated that if the film is to move at a constant rate, then the ratio of the height of each film frame to the interframe pitch of the film must be equal to the ratio of the number of *active* (i.e. picture information containing) lines of the television picture to the total number of lines per picture interval. Referring to FIG. 3, a film frame is shown the height of which is x. The interframe pitch is y. The ratio of these, which I term the utilization ratio, is x/y, and depends upon the thickness of the frame bar between adjacent film frames. This is shown somewhat exaggerated in FIG. 3.

Also, the rate at which film frames pass through the machine must equal the rate at which television pictures are produced.

It will be appreciated that in practice there are acceptable degrees of tolerance in these equalities.

With these preconditions in mind, the manner in which the telecine machine can operate for different types of film to produce television signals of different standards will now be described. In particular in the United Kingdom the primary concern is to produce television signals of 625/50 standard. In this standard there are 625 lines per picture interval and 25 pictures per second, each picture lasting 40 mS. Each picture consists of two 20 mS fields, the lines of which are interlaced. Each field has 312½ lines and the field rate is 50 fields per second. Of the 625 lines of each picture, 575 are active lines.

When used with 16 mm film, acceptable pictures result. Coincidentally, the film frame utilization ratio happens to be substantially equal to the television picture utilization ratio. The film frame rate is exactly equal to the television picture rate when the film is recorded at 25 frames/second. When the film is recorded at 24 frames/second and replayed in the telecine machine at 25 frames/second, the equality is satisfied to an acceptable extent.

35 mm film, however, poses some awkward problems. This is because 35 mm film, unlike 16 mm film, has a substantial frame bar in between successive frames, and the ratio of frame height to interframe pitch is very different from that of 16 mm film. This means that 35 mm film will be seriously over-scanned, and will be reproduced with a substantial frame bar at the top and bottom of the picture. Objects in the scene will have inadequate height in relation to their width.

I have appreciated that the problem can be avoided if the sensor array is scanned on a non-standard basis in the first place. A scanning standard is chosen which, for 625-line operation, will contain 575 lines within the displayed area of the film. A suitable system for scanning 35 mm film in this way would contain 723 lines. In general the number of lines $L_F$ required to scan the film is given by:

$$L_F/L_T = U_T/U_F$$

where $L_T$ is the number of lines in the required television standard;

$U_T$ is the utilization ratio of the television standard; and $U_F$ is the film frame utilization ratio ($=x/y$, see FIG. 3).

The surplus lines, 49 at each of the top and bottom of the picture in the example described, are subsequently discarded.

Figure 4:
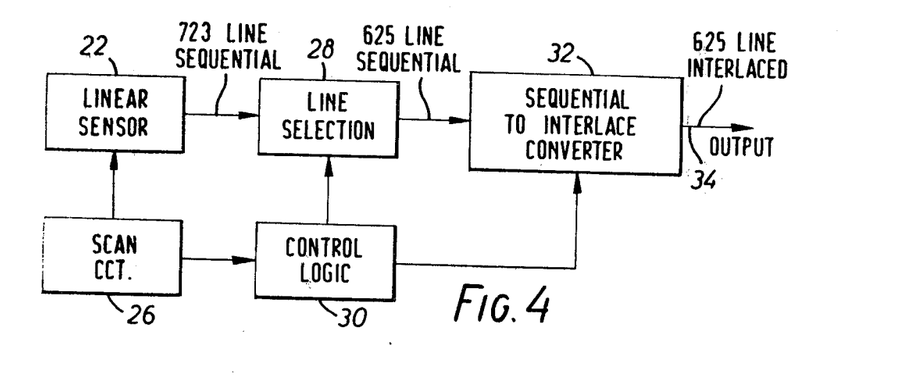
FIG. 4 is an outline block circuit diagram of the circuitry used in the telecine machine.

FIG. 4 shows in block form circuitry for producing a television signal of a desired standard from the output of the linear sensor array 22. The sensor is controlled by scanning circuits 26 to produce a sequential-type non-standard signal of 723 lines. This is applied to a line selection gate 28 which passes only 625 lines out of the 723 lines of each picture. The line selection gate 28 is controlled by control logic 30 which comprises a counter connected to the scanning circuits 26 and which counts the lines of each picture. The 625 sequential lines from the line selection gate 28 are applied to a sequential-to-interlace converter 32 which may take the form of the converter described in British Pat. No. 1,464,533. The output 34 of the converter 32 constitutes the output of the telecine machine.

The sequential signal is written into the sequential-to-interlace converter at the appropriate 723 line frequency, and then read out again at the correct line frequency in an interlaced sequence.

In this way 35 mm film can be reproduced, by initially scanning with a 723/50 television standard, and converting this electronically to the 625/50 standard. If a 525 line picture is required, then a line standard of 610 lines can be used to scan the sensor.

Sometimes it is desired to televise from "Super 8", 8 mm film, e.g. amateur on-the-spot shots of newsworthy items. This film is generally shot at 18 frames per second. The film frame rate is thus not equal to the television picture rate.

I propose in this instance replaying the film at 16⅔ (sixteen and two-thirds) frames per second, and scanning the sensor array with a non-standard 625/33⅓ system, having 625 lines in each picture the duration of which is 60 mS. In the sequential-to-interlace converter, each film frame becomes three, rather than two, successive fields, each field containing the normal 312½ lines in 20 mS. In this case the first field in each three field group is read out of the converter non-destructively. In the sequential-to-interlace converter a store which varies in total content from ⅜×625 lines to 625 lines is theoretically required. A full picture store is thus needed.

In such a system, the movement portrayal would be substantially the same as if the picture had been projected cinematographically. However, interpolation between fields can be provided if it is thought desirable, as described in more detail below.

When 16 mm or 35 mm film is used to produce a standard 525/60 television signal, there is a fundamental difficulty that each film frame must pass the sensor in 1/24 second, but must be scanned in 1/30 second. Electronic converters exist which can convert between 625/50 and 525/60 standards, so it would be possible to operate the machine as described above to produce a 625/50 signal, and then convert this electronically to a 525/60 signal. This has the disadvantages of cost and loss of quality.

I propose generating the correct number of active lines directly, as described above. This then only leaves the field rate to be corrected. Here I propose that each picture should be scanned in 1/24 or 1/25 second, and a large store then used to carry out picture rate conversion and sequential-to-interlace conversion in one combined operation. Conceptually, the operation would consist of:

(a) Temporal interpolation between pictures to produce movement portrayal appropriate to the required output picture frequency.

(b) Time redistribution to correct the picture rate; if the film is scanned in 1/24 second, 5 output pictures must be generated for every 4 input pictures; if the film is scanned in 1/25 second, 6 output pictures must be generated for every 5 input pictures.

(c) Sequential-to-interlace conversion.

The apparatus for effecting this conversion could again be based on that of British Pat. No. 1,464,533.

Thus the sensor is scanned at the equivalent of 525/48 or 525/50 standard for 16 mm film and 610/48 or 610/50 for 35 mm film, and conversion made to produce the desired 525/60 standard.

To produce a television signal having 60 fields per second from a film replayed at 16⅔ frames per second, requires converting every 5 input film frames to 9 output television pictures. Thus to produce a 525/60 signal, the film is scanned at a rate of 525/33⅓ and the resultant signal is converted electronically. If the film is replayed at 18 frames per second, then each 3 input film frames become 5 output television pictures. This slightly reduces the storage requirement.

An alternative solution would be to run the film slightly slow at 15 frames per second, and scanning 525 lines in 1/15 second. Each film frame would then become two output pictures at the 525/60 standard, that is four frames.

All these illustrations show that it is possible to overcome apparently inherent incompatibilities between the film standard and television standard by using a non-standard scanning raster to scan the film initially, and electronically converting the resultant signal to a signal of the desired standard.

In the above description, no special consideration has been given to the problems associated with colour television signals. Colour signals can be produced by having three solid state linear sensor arrays each of which receives light through a respective colour filter. These three signals can be converted into interlace form independently, using three sequential-to-interlace converters, but it is preferred to encode the signals onto a PAL type subcarrier before conversion. They can then be converted using a system of the type described in British Pat. No. 1,479,976. Such a system cannot be used where fields are repeated, as in reproducing Super 8 film, and inconvenience would be experienced when stretching or compressing information because the colour subcarrier would undergo a change of frequency. The method, although in principle applicable to NTSC, could not be used to interpolate between NTSC encoded fields.

For these various reasons it is preferred to transcode the R, G, B signals into Y, U, V form prior to the sequential-to-interlace conversion.

The amount of storage required in the sequential-to-interlace converter will now be discussed, together with the consequences of including also in the apparatus interpolation between fields to avoid any apparent judder in the resultant picture.

The basic problem is to generate n interlaced television fields from m sequentially-scanned film frames, where m and n are unrelated numbers. This can be achieved by repeating each film picture n/m times. Where n/m is not a whole number the repetition rate may cycle; i.e. n/m=2½ can be achieved by repeating the first frame twice, the second three times, the third twice and so on. If such a simple system is used, movement gives rise to judder. To combat this, movement interpolation is required.

Figure 5A:
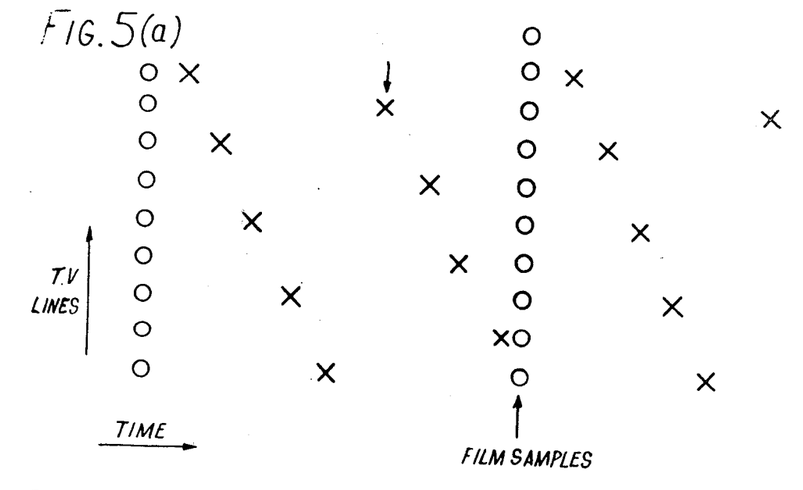
FIGS. 5(a) and 5(b) are timing diagrams illustrating the relative timing of film samples and television lines.

FIG. 5(a) illustrates the situation. The film pictures are samples of the initial scene at discrete moments of time shown by the circles; each circle shows the time at which a given line was sampled. It is necessary to generate an approximation of what these samples would have been if the scene had been televised by a television camera. The crosses in FIG. 5(a) correspond to the time at which each line would have been scanned with a television camera.

Figure 5B:
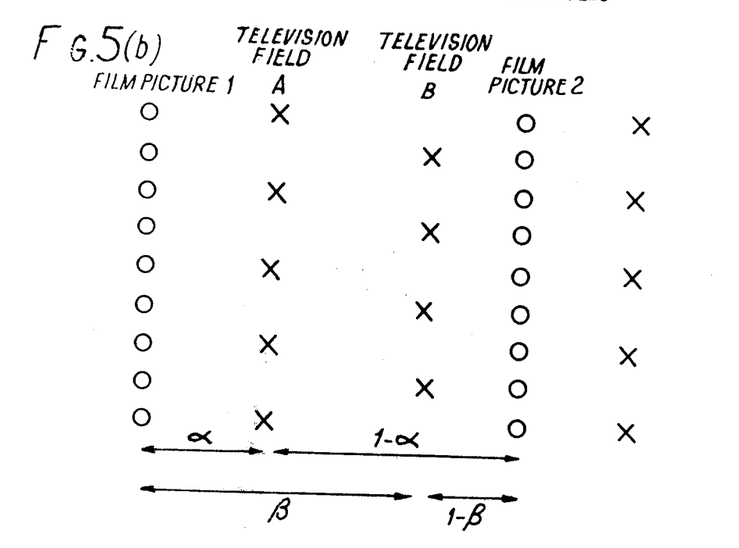

Usually the slope of the television fields in time is neglected, as this simplifies the calculation of the correct interpolation. The situation then becomes as in FIG. 5(b). With a first-order interpolation law, i.e. interpolation using two adjacent fields only, field A is then composed of $\alpha$ times picture 2 added to $(1-\alpha)$ times picture 1, and field B is $\beta$ times picture 2 and $(1-\beta)$ times picture 1. ($\alpha$ and $\beta$ are both less than 1).

Higher-order interpolation could be used, by taking contributions from more than two film frames. This is found to work well for television camera sources, where contributions taken from up to four fields produce an improvement in movement rendering. However, such fields taken from film give only two samples along the time axis (because both odd and even interlaced fields originate from the same film frame). In order to obtain a wider temporal aperture, contributions from more pictures must be obtained; the longer persistence of a given picture may then be visible as smearing. For this reason a first-order law is a good practical compromise.

The effects of higher-order (or no) interpolation on the size of storage needed are, however, easy to deduce. Each extra picture used in the interpolation requires an extra picture of storage. The values which will be calculated assume the first-order law described above; with no movement interpolation the storage may thus be reduced by one picture from the values which will be quoted.

Figure 6:
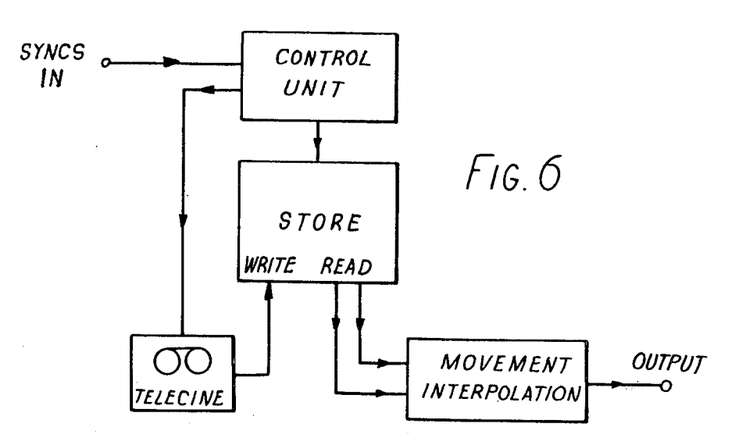
FIG. 6 is a block diagram of the conversion circuitry connected to a telecine machine.

FIG. 6 shows in more detail apparatus incorporating interpolation to improve movement portrayal. The output from the solid-state telecine is written into a store; it is then read out when required. Two outputs are taken in order to provide movement interpolation and the same store also accomplishes the re-ordering necessary for sequential-to-interlace conversion. After the signal from a given picture line is finished with, it is erased, usually by overwriting with later information.

The control unit supervises the operation of the store and feeds the telecine transport with synchronising information to keep the film running at the correct speed. It must also feed pulses to the line sensor and the line selection control logic 30 in FIG. 4 via the scan circuit 26, so that the correct number of lines per film picture are generated; this will cater for a change in line standard from 625 to 525 (or 819 or any other) lines per television picture.

The size of the store is obviously of great importance. This will now be calculated.

Figure 7:
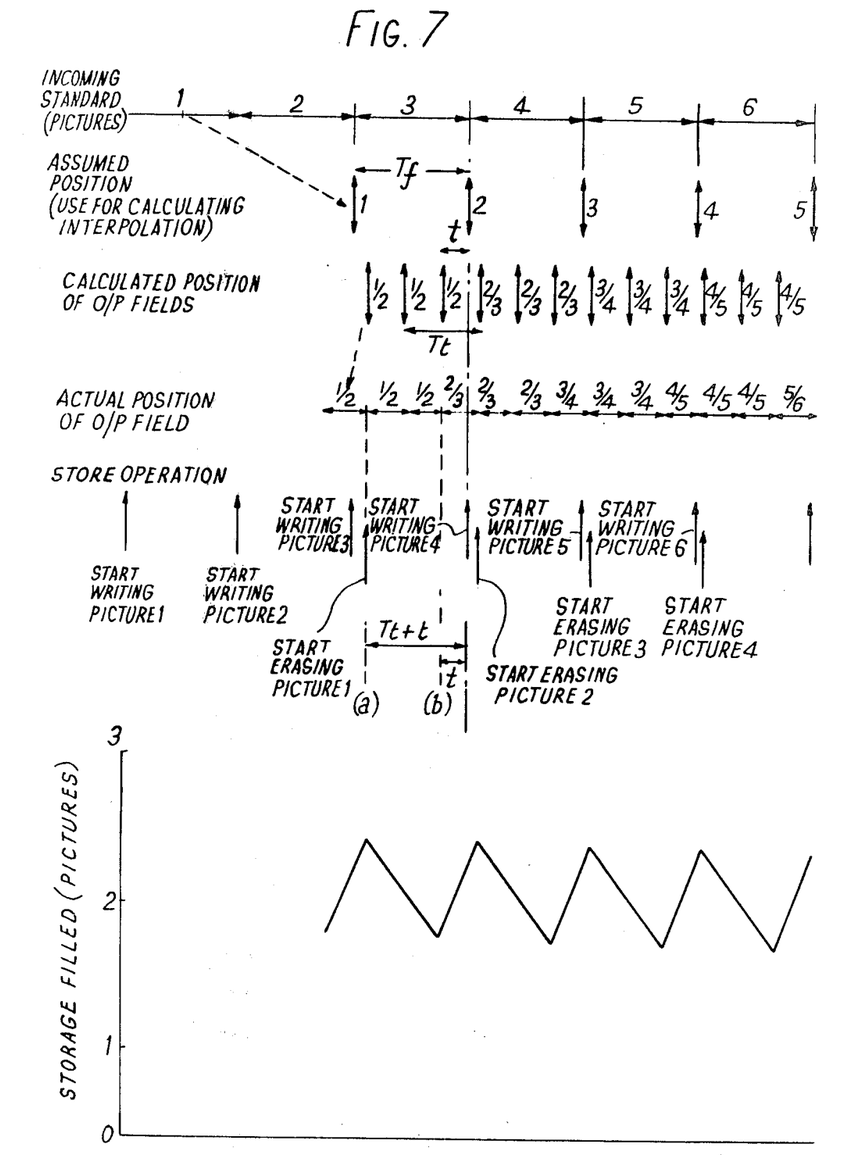
FIG. 7 is a timing diagram illustrating the relative timing of film frames and television fields, assuming the field rate is greater than the frame rate.

FIG. 7 illustrates the operation of the store. Information is continuously being written into the store from the film being scanned. In order to calculate the contributions to each field form each film frame it is convenient to consider the film information to be valid only at a given instant in time. The particular instant chosen is immaterial, choosing the end of the following picture minimises the overall storage. This choice is shown in the second line of FIG. 7.

In the same way, the information is continuously being read out to form television fields, as shown in the fourth line of FIG. 7. Again one field can be considered to exist at a given instant and here the end of that particular field is chosen, as shown in the third line of FIG. 7.

Because there is no line interpolation, a film picture can start to be erased from the store at the beginning of the last-but-one field to use information from that picture. It will be assumed for the moment that the television picture rate (half the field frequency) is higher than the film picture rate, the instant when the film information starts to be erased is then the time at which the store is most full. This is instant (a) in FIG. 7; likewise instant (b) is the time at which the store is most empty.

If the time between film pictures is $T_f$, the time between television pictures $T_t$, and the offset time, namely the time between the end of a film picture and the end of the television frame immediately preceding it is t, shown on FIG. 7, then the storage at (a) is:

$$\text{Picture 1} + \text{Picture 2} + \frac{(T_f - T_t - t)}{T_f} \times \text{Picture 3} \quad (1)$$

$$\text{or: } 3 - \frac{(T_t + t)}{T_f} \text{ pictures,}$$

Likewise at (b) the storage is:

$$\text{Picture 2} + \frac{(T_f - t)}{T_f} \times \text{Picture 3} \quad (2)$$

$$\text{or: } 2 - \frac{t}{T_f} \text{ pictures.}$$

The storage used throughout the cycle varies linearly between these values as shown in the bottom line of FIG. 7.

Figure 8:
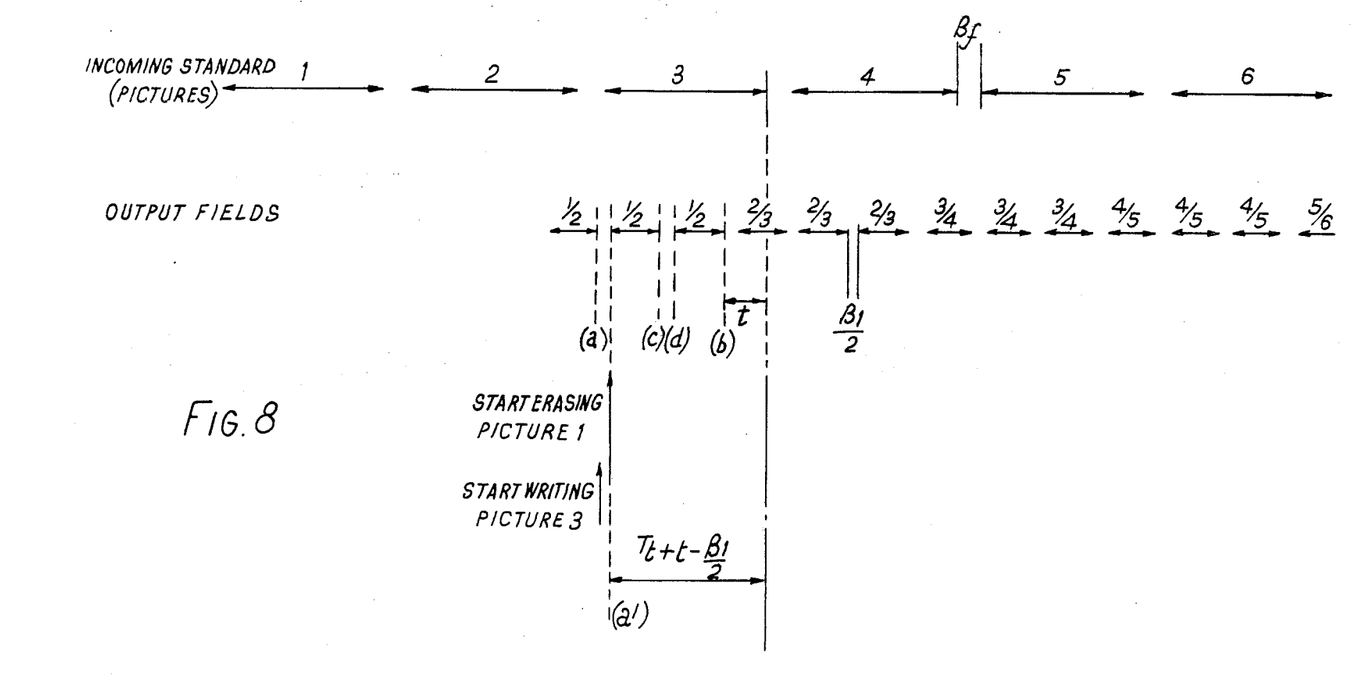
FIG. 8 illustrates the effect of removing blanking intervals.
Figure 9:
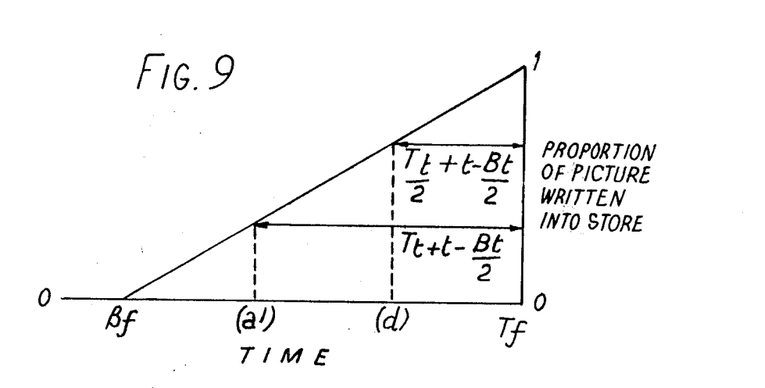
FIG. 9 illustrates the estimation of storage requirement.

The above description assumes that all of the film information is stored. In practice the film lines corresponding to frame blanking need not be stored in order to economise on storage. The output television pictures will also be blanked. The effect of this is shown in FIG. 8. $\beta_f$ represents the time for which the film input is blanked and $\beta_t$ the total time for which the television output is blanked ($\beta_t/2$ per field). At time (a') the storage is:

$$\text{Picture 1} + \text{Picture 2} + \left(1 - \frac{T_t + t - \frac{\beta_t}{2}}{T_f - \beta_f}\right) \times \text{Picture 3 or:} \quad (3)$$

$$3 - \frac{T_t + t - \frac{\beta_t}{2}}{T_f - \beta_f} \text{ pictures.}$$

And at (d) we have a storage of:

$$\tfrac{1}{2} \times \text{Picture 1} + \text{Picture 2} + \left(1 - \frac{\frac{T_t}{2} + t - \frac{\beta_t}{2}}{T_f - \beta_f}\right) \times \text{Picture 3} \quad (4)$$

with similar equations for storage at (a), (b) and (c). If $$T_t > T_f - \beta_f$$

then the storage in (4) is greater than that in (3), and vice versa. Comparing equations (1) and (3), the storage in (3) is not greater than that in (1) provided that:

$$\frac{T_t + t - \frac{\beta_t}{2}}{T_f - \beta_f} \geq \frac{T_t + t}{T_f}$$

or provided that $$\frac{\beta_t}{2(T_t + t)} \leq \frac{\beta_f}{T_f}$$

For any allowable positive value of t, t=0 represents the worst case and this equation reduces to:

$$\frac{\beta_t}{T_t} \leq \frac{2 \cdot \beta_f}{T_f} \quad (5)$$

A comparison between equations (1) and (4) is not so simple and, in general, needs to be solved for each specific example. However, it is clear from inspection that t=0 is again the worst-case condition for all positive values of t, and if it is assumed that $\beta_t/T_t$ is never greater than $\beta_f/T_f$ (a condition which is met in practice by all the examples that will be quoted) it may be found that provided $T_t \leq T_f$ equation (4) is no greater than equation (1).

Thus the system will work perfectly satisfactorily if the film input is not stored during frame blanking provided that the ratio between television and film blanking is such that:

$$\frac{\beta_t}{T_t} \leq \frac{\beta_f}{T_f} \text{ for } T_t < T_f - \beta_f \quad (6)$$

$$\frac{\beta_t}{T_t} \leq \frac{\beta_f}{T_f} \text{ for } T_f - \beta_f < T_t \leq T_f$$

These conditions are, in practice, met by all the examples which will be given. Not storing the input during frame blanking can provide a considerable saving in storage required (8% for 625 line television).

Figure 10:
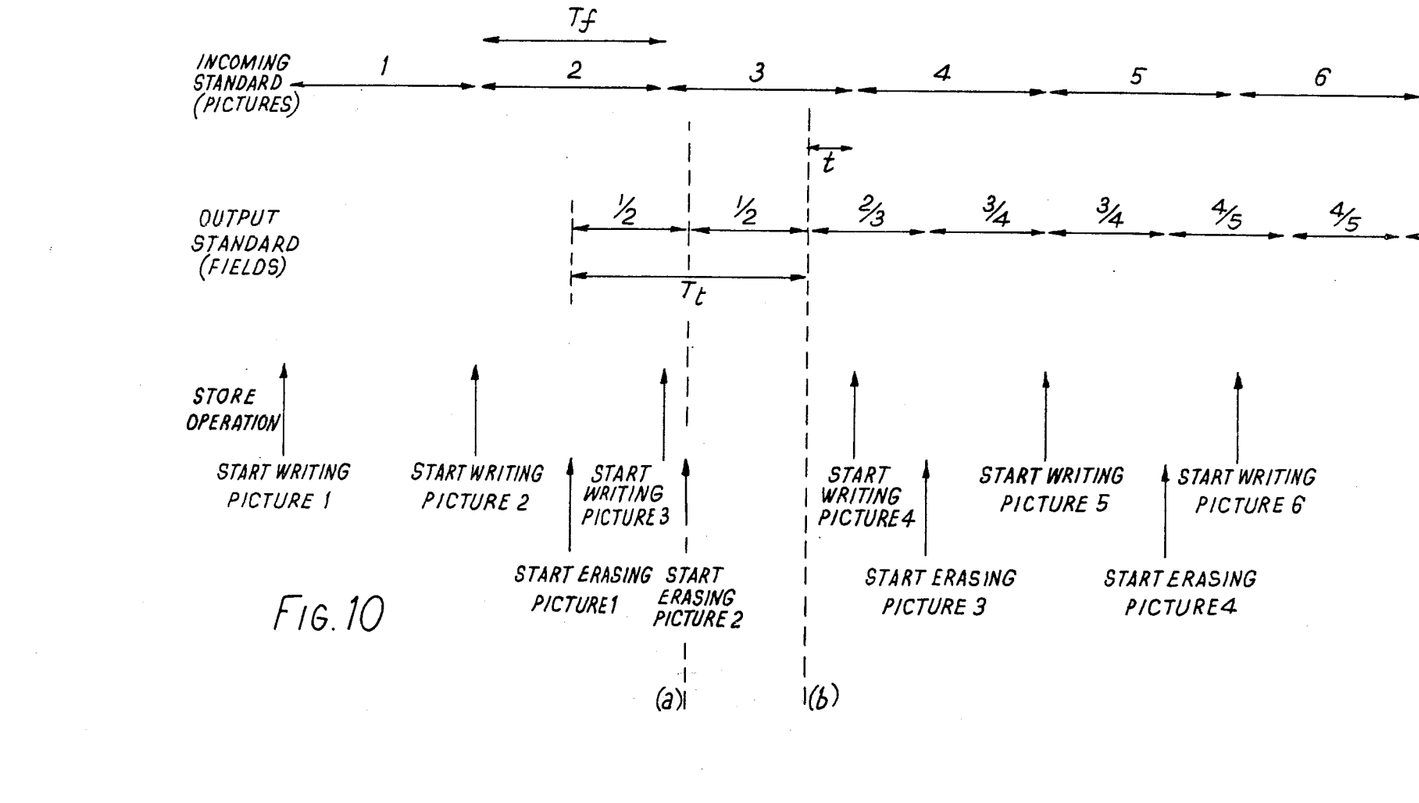
FIG. 10 is a timing diagram showing differences which arise if the field rate is less than the frame rate.

It is assumed above that the film frame is slower than the television field rate. However, FIG. 10 shows operation of the system with $2T_f > T_t > T_f$. The information gradually accumulates in the store until at (a) two pictures are erased at the same time. The storage at (a) is:

$$2 + \frac{T_f - T_t - t}{T_f} = 3 - \frac{T_f + t}{T_f} \text{ pictures} \quad (7)$$

and this equation shows that the results above for $T_t < T_f$ are still valid. The storage at (b) is now, however:

$$\tfrac{1}{2} + \frac{T_f - t}{T_f} = 1\tfrac{1}{2} - \frac{t}{T_f} \text{ pictures,} \quad (8)$$

and this is not the same as above.

For values to $T_t$ greater than $2T_f$, some input film frames are not used at all (or at least alternate lines are not used). This information is then never written in (conceptually it is erased immediately after writing) and the maximum storage is then still as in equations 1 and 5. The minimum storage does vary, but this is of no consequence.

A number of specific examples will now be described.

1. Unlocked Input

This is the case where the film input speed is not locked to the television waveform. For this case t is free to take any value between $T_t/2$ and just above zero, the actual value of zero corresponds to the case where the information from only one picture is needed to create the output and in this case the previous picture may be erased one field earlier giving a saving in storage; i.e. the case t=0 corresponds exactly to the case t=$T_t/2$. Sooner or later t will assume a value that is very close, but not equal to, zero. The storage required will then be $(3 - T_t/T_f)$ pictures.

2. Locked Input

Locking the film speed considerably simplifies the situation. Only a certain number of values are now allowed for t, one of which is usually made to be zero. There is thus a minimum value of t($t_{min}$) which gives rise to the greatest storage requirement.

In the following figures no allowance has been made for the possible extra saving due to blanking.

2(i). Output rate 25 pictures/sec. (50 fields/sec.)

(a) Input rate 25 frames/sec.

For this rate $t_{min}$ is $T_f/2$ and $T_t = T_f$. Therefore the storage required is 1½ pictures. Only ½ picture is needed for the sequential-to-interlace conversion; the other picture is used to give interpolation.

(b) Input rate 24 frames/sec.

$t_{min}$ is now $0.04T_f$ and $T_t$ is $0.96T_f$. The storage required is then 2 pictures.

(c) Input rate 18 frames/sec.

$t_{min}$ is $0.04T_f$ and $T_t$ is $0.72T_f$. Storage is 2.26 pictures.

(d) Input rate 16⅔ frames/sec.

$t_{min}$ is ⅛$T_f$ and $T_t$ is ⅞$T_f$. Storage is 2 pictures. This is smaller than for the previous case, and so this could be the preferred running speed chosen for replay of 8 mm film shot at 18 frames/sec. Again, it has been shown above that for sequential-to-interlace conversion only, one picture of storage is needed.

2(ii). Output raate 30 pictures/sec. (60 fields/sec.)

(a) Input rate 25 frames/sec.

$t_{min}$ is $0.17T_f$, $T_t$ is $0.83T_f$. Storage is 2 pictures. Because of the reduced number of lines per field, these pictures are, however, smaller than the pictures needed for the 625/50 system.

(b) Input rate 24 frames/sec.

$t_{min}$ is $0.2T_f$, $T_t$ is $0.8T_f$. Storage is again 2 pictures.

(c) Input rate 18 frames/sec.

$t_{min}$ is $0.2T_f$, $T_t$ is $0.6T_f$. Storage is 2.2 pictures.

(d) Input rate 15 frames/sec.

$t_{min}$ is $0.25T_f$, $T_t$ is $0.5T_f$. Storage is 2.25 pictures.

2(iii). Inching—any output standard

This concerns a very slow film frame rate, for which $T_t$ is very small compared with $T_f$. The storage tends to 3 pictures. Such a machine would enable films to be run in very slow motion. However, the quality of the movement interpolation may be inadequate under these circumstances. An extra picture of storage could be provided just for inching.

The storage could be implemented in a number of ways, but the use of 16K RAMs is presently preferred. For colour operation this will be suitable with signals of just under 4 $f_{sc}$ bandwidth, where $f_{sc}$ is the colour sub-carrier frequency.

It will be seen from the above that if movement interpolation is to be provided, additional storage is required above that needed for sequential-to-interlace conversion. The amount of flexibility of the apparatus depends on the amount of storage. If first-order interpolation is used there are a number of possibilities, for example:

(a) Using 1 field of storage. This is suitable for 625/50 televising of 16 and 35 mm film at 25 frames/sec. without movement interpolation.

(b) Using 2 pictures (625/50) of storage. This is suitable for showing 16, 35 and 8 mm film at 24, 25 and 16⅔ frames/sec. with movement interpolation on 625/50 or 525/60 standards. The speed will probably be 18 frames/sec. when televising 8 mm film on the 525/60 system.

(c) Using 1 picture of storage for showing 16, 35 and 8 mm film without movement interpolation on the 625/50 television system.

(d) Using 3 pictures of storage which will show film at any speed down to still frame.

Colour information could be stored in Y, U, V form with a total bandwidth of just less than $4f_{sc}$, a total of 911 samples to be shared between Y, U and V would be available per active line.

I claim:

1. A telecine machine, comprising:
    a linear light sensor array;
    a light source;
    drive means for moving film at a constant rate between said light source and said sensor array in a direction substantially perpendicular to a plane containing said sensor array;
    optical means for imaging an illuminated section of film on said sensor array; and
    electronic means for deriving a television signal from said sensor array and for converting said signal from sequential to interlace form;
    wherein the improvement consists in that:
    said electronic means comprises first signal rate providing means for providing a first sequential-type non-standard television signal obtained by driving and scanning the film at a rate related to the film frame rate and film utilization ratio,
    second signal rate providing means for electronically converting said first signal to provide a second interlaced-type standard television signal having a lower line rate from said first signal, and
    wherein said first signal rate providing means is arranged to scan the film at a line rate which bears to the line rate of the second signal substantially the same ratio as the television picture utilization ratio bears to the film frame height utilization ratio.

2. A telecine machine according to claim 1, wherein said second signal rate providing means includes a storage device capable of storing an integral number of television fields.

3. A telecine machine according to claim 1, wherein said second signal rate providing means is additionally operative to change the field rate.

4. A telecine machine according to claim 3, wherein said second signal rate providing means further includes means for interpolating between fields of said first signal.

5. A telecine machine according to claim 3, wherein said second signal rate providing means includes a storage device capable of storing one television field.

6. A telecine machine according to claim 3, wherein said second signal rate providing means includes a storage device capable of storing two television pictures.

7. A telecine machine according to claim 3, wherein said second signal rate providing means includes a storage device capable of storing one television picture.

8. A telecine machine according to claim 3, wherein said second signal rate providing means includes a storage device capable of storing three television pictures.

9. A telecine machine according to claim 3, wherein during blanking said television signals are not stored in said second signal rate providing means.

10. A method of generating an interlaced-type standard television signal comprising the steps of:
    providing a first sequential-type non-standard television signal by driving and scanning a film; and
    electronically converting said first signal into a desired interlaced-scan standard television signal having a different line and/or field rate from the said first signal;
    wherein said film is scanned at a line rate which bears to the line rate of said standard signal substantially the same ratio as the television picture utilization ratio bears to the film frame height utilization ratio.

11. A telecine machine, comprising:
a linear light sensor array;
a light source;
drive means for moving film at a constant rate between said light source and said sensor array in a direction substantially perpendicular to a plane containing said sensor array;
optical means for imaging an illuminated section of film on said sensor array; and
electronic means for deriving a television signal from said sensor array and for converting said signal from sequential to interlace form;
wherein the improvement consists in that:
said electronic means comprises first signal rate providing means for providing a first sequential-type non-standard television signal obtained by driving and scanning the film at a rate related to the film frame rate and film utilization ratio, and
second signal rate providing means for electronically converting said first signal to provide a second interlaced-type standard television signal having a different line and/or field rate from said first signal, said second signal providing means being additionally operative to change the field rate and further including means for interpolating between fields of said first signal.

* * * * *